United States Patent
Sølbeck

(10) Patent No.: US 6,253,522 B1
(45) Date of Patent: Jul. 3, 2001

(54) ANCHOR DEVICE

(75) Inventor: Peter Sølbeck, Rungsted Kyst (DK)

(73) Assignee: Polysheet A/S, Herlev (DK)

( * ) Notice: Subject to any disclaimer, the term of this patent is extended or adjusted under 35 U.S.C. 154(b) by 0 days.

(21) Appl. No.: 09/308,275

(22) PCT Filed: Nov. 17, 1997

(86) PCT No.: PCT/DK97/00526

§ 371 Date: May 17, 1999

§ 102(e) Date: May 17, 1999

(87) PCT Pub. No.: WO98/27346

PCT Pub. Date: Jun. 25, 1998

(30) Foreign Application Priority Data

Nov. 18, 1996 (DK) .................................................. 9600410

(51) Int. Cl.$^7$ .............................. E04G 1/26; F16B 45/02
(52) U.S. Cl. .................... 52/698; 24/16 PB; 24/601.1; 24/907; 160/404; 135/119
(58) Field of Search .............................. 52/698; 24/598.2, 24/601.1, 16 PB, 16 R, 907; 248/74.2, 74.3, 74.4; 160/403, 404; 135/119, 907

(56) References Cited

U.S. PATENT DOCUMENTS

| | | | |
|---|---|---|---|
| 3,111,734 | * | 11/1963 | Pachner ............................ 24/601.1 X |
| 3,779,494 | * | 12/1973 | Nicholson et al. ............. 24/16 PB X |
| 4,061,873 | * | 12/1977 | Berg, Jr. et al. ................ 24/601.1 X |
| 4,901,403 | * | 2/1990 | Larsen ................................ 24/16 PB |
| 5,387,250 | * | 2/1995 | Solbeck .............................. 24/16 PB |
| 5,758,392 | * | 6/1998 | Anscher et al. ................ 24/601.1 X |
| 5,772,258 | * | 6/1998 | Dyer et al. ...................... 24/16 PB X |
| 5,806,819 | * | 9/1998 | Martone ........................ 24/16 PB X |

FOREIGN PATENT DOCUMENTS

| | | | |
|---|---|---|---|
| 1177524 | * | 9/1964 | (DE) .................................. 24/16 PB |
| 310850 | | 4/1989 | (EP) . |
| 2230553 | | 10/1990 | (GB) . |
| 2254879 | | 10/1992 | (GB) . |

OTHER PUBLICATIONS

Pinnolis, S. "Wire Securing Clip" Technical Digest No. 50, Western Electric, pp. 23–24, Apr. 1978.*

* cited by examiner

*Primary Examiner*—Laura A. Callo
(74) *Attorney, Agent, or Firm*—Smith, Gambrell & Russell, LLP

(57) ABSTRACT

An anchor member for mounting a tarpaulin to a bearing structure includes: a shaft; an obliquely arranged transverse pin located at a first end of the shaft; a rod member protruding from the shaft and having a first hook-shaped protrusion at an end thereof; and a double hook located at a second end of the shaft. The double hook includes two hook arms positioned on opposite sides of the shaft, and each of the hook arms has an opening. One hook arm includes a second hook-shaped protrusion that engages the first hook-shaped protrusion of the rod member to thereby form a spring lock that completely closes the opening of the first hook arm. In use, an elastic band connects the anchor member with a bearing construction, wherein the elastic band, when mounted, is received in the openings of the hook arms of the anchor member.

4 Claims, 1 Drawing Sheet

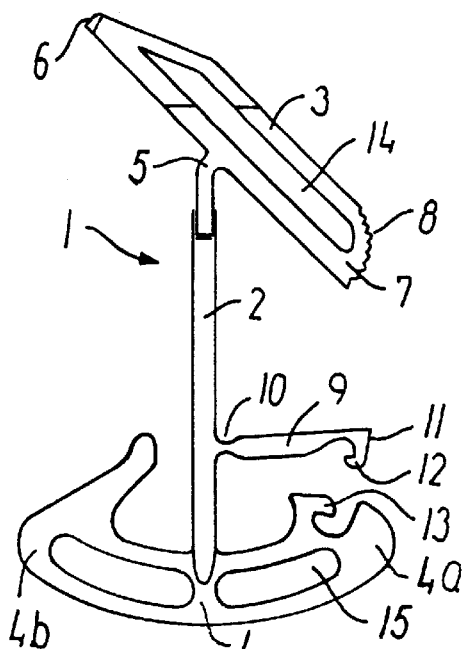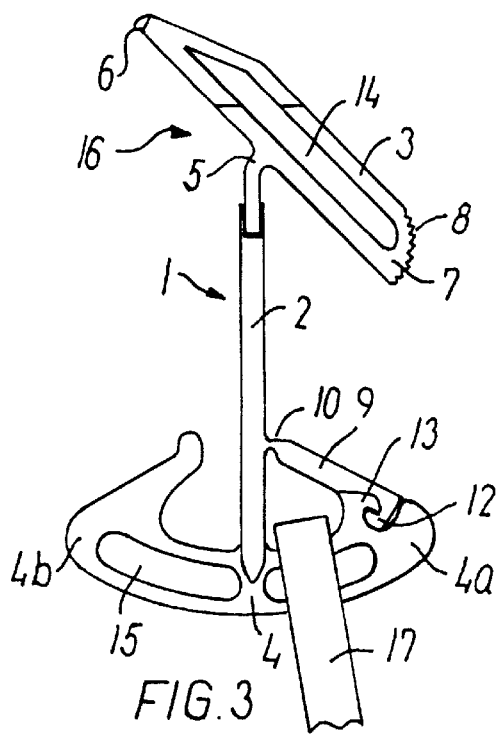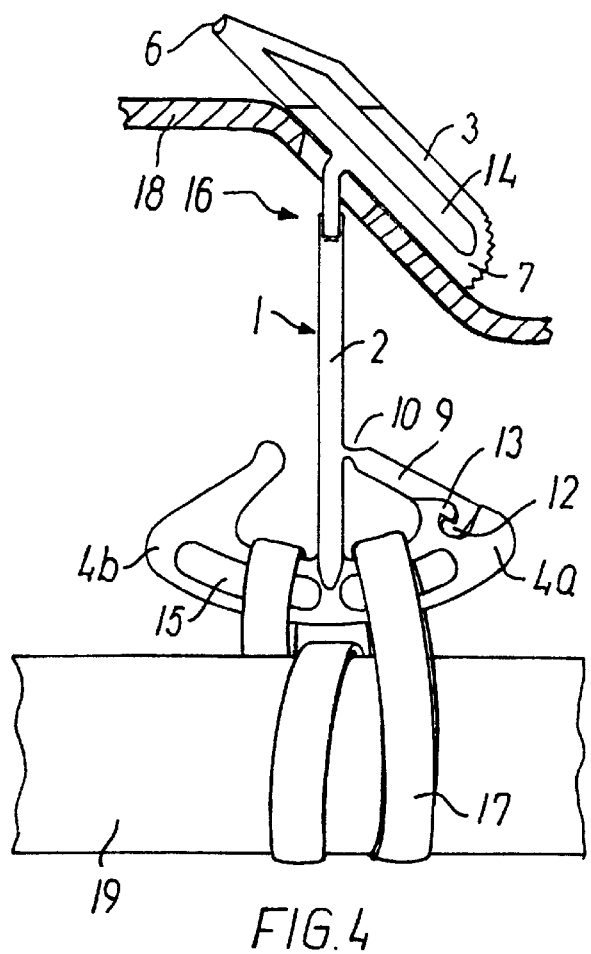
FIG.1
FIG.3
FIG.2
FIG.4

ANCHOR DEVICE

The present invention relates to an anchor device for fastening tarpaulins and the like weather-shielding covering materials to a bearing construction, in particular a scaffolding, comprising a substantially anchor-shaped anchor member with a shaft portion with two ends, a transverse pin placed at one end of the shaft portion and obliquely positioned relative to the longitudinal direction of the shaft portion, said transverse pin being connected with the shaft portion by means of a resilient hinge joint, and a double hook placed at the other end of the shaft portion with two hook arms positioned on opposite sides of the shaft portion, each of said hook arms having an opening, and an elastic band for connecting the anchor member with the bearing construction, which band, when mounted, is received in the openings of the double hook on the anchor member, the anchor member having closing means integral with the anchor member for retaining the band in at least one of the openings of the double hook, said closing means being intended for closing completely the associated double-hook opening.

For fastening tarpaulins to scaffolding and the like supporting structures, it is well known to use anchor devices or straps, in which an anchor pin after having been passed through the tarpaulin serves as abutment on the exterior side of the tarpaulin. The anchor pin may either be passed through the tarpaulin through an eye designed for that purpose or through a hole made in the tarpaulin, either prior to or simultaneously with the insertion of the pin.

In a known anchor device the anchor member is designed as a comparatively rigid anchor, one double hook opening of which is partially closed by means of a cast protrusion on the shaft portion.

This anchor device has turned out to function fairly well in practice and is easy and cheap in manufacture, but firstly it is, on account of the rigid construction, difficult to bring the transverse pin to a position, in which it allows introduction of the anchor member through a tarpaulin eye or a hole, and secondly, the elastic band may inadvertently be loosened and fall out of the hook opening during the mounting in spite of the protrusion on the shaft portion.

GB-A-2254879 discloses a device corresponding to the type indicated in the introduction. In this device, the shaft portion includes a bendable region of limited strength allowing the transverse toggle to be bent back in order to ease insertion. The closing means comprise a latch for closing each hook opening completely.

However, both of these known devices suffer from the drawback that the other opening of the hook, i.e. the opening opposite the partially or completely closed opening, will be closed by a pull in the band which is received in the partially or completely closed opening, the associate hook arm being pulled in a direction away from the transverse pin. This results in turn in that the band cannot or only with difficulty be introduced in the free opening for the attainment of the assembled condition.

In DK-B-156 307, corresponding to EP-A1-0310850, attempts have been made to eliminate some of these drawbacks by an anchor device comprising a rubber band which at one end is pivotally connected with a transverse pin tapering at one end and having at its other end a snap hook which at the mounting is taken around a support member and subsequently hooked on the rubber band. The pivotal movement between the rubber band and the transverse pin has been established by making the transverse pin in two parts with a separate locking part.

Even though this anchor device thus eliminates the drawbacks in respect of insertion and prevents the band from getting loose from the anchor member, it becomes on account of the necessarily somewhat complex design more complicated and consequently more expensive to manufacture, which is a substantial drawback as the anchor devices often are discarded after use and thus not reused.

On the background of this the object of the invention is to improve an anchor device of the type mentioned by way of introduction in such a manner that it is easy to handle and the same time ensures that the band is kept in place in the hook opening during the mounting.

To meet this object the anchor device according to the invention is characterized in that the closing means are constituted by a spring lock, and that the spring lock is designed as a rod member protruding from the shaft portion with a hook-shaped protrusion for engaging a hook-shaped protrusion made in the same manner on the double hook in a locked position.

In this way the desired easy mounting of the anchor device and the safe retaining of the band in the double hook opening during the mounting are established. Due to the engagement between the hook-shaped protrusions on the rod member and the double hook, the section comprising the hook arm, the rod member and the lower part of the shaft portion constitutes a closed construction which is particularly resistant to bending. As a consequence of this, the deformation arising from a pull in the elastic band will be moved from the double hook area in a direction towards the transverse pin, the other opening being kept open all the time, such that the band can be introduced straight away into this opening for the attainment of the mounted condition of the anchor device. The assembly of the anchor device may be made in a most simple manner, the band being introduced in the opening in the open position of the spring lock, following which the lock is activated by means of one single manipulation step, and there is no risk of losing the spring lock.

One end of the transverse pin may be tapered and the other end be designed as a rounded press surface. In this embodiment the anchor device can also be used in connection with tarpaulins without eyes, no separate tools being required prior to the introduction of the anchor member to provide a hole for introduction. The rounded press surface gives a comfortable and effective grip.

The invention will be explained in detail in the following by means of an example of an embodiment and with reference to the drawings, in which FIG. 1 is a lateral view of an anchor member constituting a part of an anchor device according to the invention, FIG. 2 is a view of the anchor device shown in FIG. 1, seen from above, FIG. 3 is a lateral view of the anchor device according to the invention, and FIG. 4 is likewise a lateral view of an anchor device according to the invention used for fastening a tarpaulin to a support member.

The anchor device shown in the drawings comprises an anchor member generally designated 1, said member having substantially the form of an anchor, with a shaft portion 2, a transverse pin 3 and a double hook 4 with two hook arms 4a and 4b. The transverse pin 3 is connected with the shaft portion 2 by means of a hinge joint 5 having a somewhat smaller cross-section than the shaft portion, such that it is resilient, i.e. easy to bend, but still elastic. Furthermore, the transverse pin 3 is at its upper or front end 6, which is the end adapted to be introduced through a tarpaulin, made with a tapering, both seen from the side and from above in FIG. 2. In the lower or rear end 7, the transverse pin is made with a rounded press surface, which as shown may be provided with a toothing 8 for further facilitating the handling of the anchor member.

Further down the shaft portion 2, a rod member 9 is via a constricted portion 10 integral with the shaft portion 2. At the free end 11 of the rod member 9 a hook-shaped protrusion 12 is provided which together with a corresponding hook-shaped protrusion 13 on one of the double hook arms 4a forms a spring lock. As will appear, the rod member 9 forms a bridge between the free end of the hook arm 4a and the shaft portion 2, such that the section comprising hook arm 4a, rod member 9 and the lower part of the shaft portion 2 constitute a closed construction which is particularly resistant to bending.

The anchor member 1 may advantageously be cast in a suitable plastic material which has the desired properties in respect of flexibility, elasticity and strength. In view of saving material and weight recesses 14 and 15 are provided in both the double hook 4 and the transverse pin 3.

By assembly of the anchor device 16 shown in FIG. 3, an elastic band 17, which has the shape of a flat closed rubber band, but which could also be made as a single band with an eye at each end, is taken over one of the double hook arms 4a, following which the rod member 9 is bent downwards until the protrusion 12 engages the protrusion 13. This bending operation is facilitated by the constricted portion 10.

In FIG. 4 the anchor device 16 is shown in use. The transverse pin 3 is passed through a tarpaulin 18, and the band 17 is as shown placed around a support member 19 constituting a part of a bearing construction, for instance a scaffolding, and finally, the band is hooked into the second hook arm 4b of the double hook 4. This operation does not present any problem with the device according to the invention, the opening of the hook arm 4b being kept open all the time, even when the elastic band 17 is pulled.

What is claimed is:

1. An anchor device, comprising:
   a substantially anchor-shaped anchor member including:
      a shaft portion extending in a longitudinal direction and having a first end and a second end,
      a transverse pin located at the first end of the shaft portion and obliquely positioned relative to the longitudinal direction of the shaft portion, the transverse pin being connected with the shaft portion by means of a resilient hinge joint,
      a rod member protruding from the shaft portion at a location between the first end and the second end, wherein the rod member has a first hook-shaped protrusion at an end thereof, and
      a double hook located at the second end of the shaft portion, the double hook including a first hook arm and a second hook arm positioned on opposite sides of the shaft portion, each of the hook arms having an opening, wherein an end of the first hook arm includes a second hook-shaped protrusion,
      wherein the first hook-shaped protrusion of the rod member engages the second hook-shaped protrusion of the first hook arm to thereby form a spring lock that completely closes the opening of the first hook arm; and
   an elastic band for connecting the anchor member with a bearing construction, wherein the elastic band, when mounted, is received in the openings of the hook arms of the anchor member.

2. An anchor device according to claim 1, wherein a first end of the transverse pin is tapered and a second end of the transverse pin is designed as a rounded press surface.

3. A substantially anchor-shaped anchor member, comprising:
   a shaft portion extending in a longitudinal direction and having a first end and a second end;
   a transverse pin located at the first end of the shaft portion and obliquely positioned relative to the longitudinal direction of the shaft portion, the transverse pin being connected with the shaft portion by means of a resilient hinge joint;
   a rod member protruding from the shaft portion at a location between the first end and the second end, wherein the rod member has a first hook-shaped protrusion at an end thereof; and
   a double hook located at the second end of the shaft portion, the double hook including a first hook arm and a second hook arm positioned on opposite sides of the shaft portion, each of the hook arms having an opening, wherein an end of the first hook arm includes a second hook-shaped protrusion,
   wherein the first hook-shaped protrusion of the rod member engages the second hook-shaped protrusion of the first hook arm to thereby form a spring lock that completely closes the opening of the first hook arm.

4. An anchor member according to claim 3, wherein a first end of the transverse pin is tapered and a second end of the transverse pin is designed as a rounded press surface.

* * * * *